(12) United States Patent
Gabrys

(10) Patent No.: US 6,767,589 B1
(45) Date of Patent: Jul. 27, 2004

(54) METHOD FOR METAL COATING A FLYWHEEL RIM

(75) Inventor: Christopher W. Gabrys, Federal Way, WA (US)

(73) Assignee: Toray Composites (America), Inc., Tacoma, WA (US)

(*) Notice: Subject to any disclaimer, the term of this patent is extended or adjusted under 35 U.S.C. 154(b) by 0 days.

(21) Appl. No.: 09/688,544

(22) Filed: Oct. 12, 2000

Related U.S. Application Data

(60) Provisional application No. 60/159,041, filed on Oct. 12, 1999.

(51) Int. Cl.$^7$ .............................. B05D 1/36; C25D 5/54; C25D 5/56; C23C 28/02
(52) U.S. Cl. ....................... 427/404; 427/250; 205/159; 205/165; 205/186
(58) Field of Search ........................... 427/250, 255.11, 427/404; 205/186, 159, 165

(56) References Cited

U.S. PATENT DOCUMENTS 6,203,924 B1 * 3/2001 Smith ......................... 428/593

OTHER PUBLICATIONS

"Outgassing from epoxy Resins and Methods for Its Reduction" Gupta et al., Sep. 4, 1976.
"Flywheel Energy Systems: Current Status and Future Prospects" Bowler, Sep. 22, 1997.
"Outgassing Measurement of Clad and Inclad Cabon Composite Laminates" Frink et al. 1992, Month Unavailable.
"Gassing and Dimensional Changes of Polymer Matrix Composites in Space", Tennyson et al. (exact date unknown, >1991).
"Composites In Space" NASA—Tennson et al. May, 1991.

* cited by examiner

*Primary Examiner*—Edna Wong
(74) *Attorney, Agent, or Firm*—J. Michael Neary

(57) ABSTRACT

A composite flywheel rotor includes an annular rim mounted on a hub for high speed rotation in an evacuated flywheel enclosure. A smooth epoxy layer is applied to the rim and is cleaned or maintained clean in preparation for a metal coating on the rim. The rim may be baked in a vacuum furnace to drive off the volitiles and water vapor, and a thin metal coating is applied over the entire rim to retard outgassing from the resin in the flywheel composite rim. The metal coating on flywheel rim is preferably aluminum because aluminum adheres well to epoxy and is economical. The metal coating is deposited on the flywheel rim by physical vapor deposition and may be built up after an initial PVD coating by electroplating. A tough protective polymer is applied over the metal coating to protect metal coating from mechanical damage during handling.

19 Claims, 1 Drawing Sheet

Metal Coating on all exposed surfaces

METHOD FOR METAL COATING A FLYWHEEL RIM

This is related to U.S. Provisional Application No. 60/159,041 filed on Oct. 12, 1999 and entitled "Metal Coated Flywheel".

This invention pertains to high speed composite flywheel systems, and more particularly to a composite flywheel rim having a thin metal coating to prevent off-gassing from the composite resin during operation in the flywheel vacuum chamber.

BACKGROUND OF THE INVENTION

Flywheel systems have been used for many years for storing energy in the systems, and then releasing that stored energy back into the other system. They provide a smoothing effect for internal combustion engines and many kinds of power equipment. More recently, modern flywheel systems have become recognized as very attractive energy storage systems in electrical applications such as uninterruptible power supplies, utility load leveling, electric vehicles and battery replacement.

Modern flywheel systems used for electrical energy storage convert the electrical energy to mechanical energy of a high speed rotating flywheel rotor, and back again. The flywheel system includes a flywheel rotor (hub and rim), and stator on the hub shaft that function as an electric motor during storage of electrical energy and as a generator during regeneration of electrical energy when the stored energy is to be recovered. The flywheel system is normally contained in a vacuum enclosure that protects it from windage losses that would occur from operation in a gas atmosphere, and provides ballistic protection against possibly catastrophic failure of a flywheel rotor rotating at high speed.

The flywheel rim usually comprises a composite ring made of resin-impregnated filaments wound in the hoop direction. The rim can be made of one or multiple types of fiber in a concentric ring arrangement. One example would be using an E-glass/epoxy ring inside a carbon/epoxy ring. The fibers are typically wound on a mandrel as B-staged prepreg or wet rovings, and then are cured at moderate temperature in a curing oven or autoclave. During curing, the resin outgasses normally and the gasses and vapors are evacuated through the usual ventilation system in the curing facility.

After curing, the flywheel rim appears to be stable, but in fact the resin continues to outgas at a very low rate. These outgasses include volatiles in the resin and water in the resin and adsorbed in the surface of the fibers. Ordinarily, these gasses and vapors are insignificant because they are at such a low rate that they are virtually undetectable. However, in a vacuum, which is the environment in which a flywheel operates, the rate of outgassing from a cured resin in a composite flywheel rim is both greater and of more significant consequence. The rate is greater because the rate of evaporation is a function of partial pressure, which is low in a vacuum chamber, and the consequence is greater because the vacuum in the vacuum chamber becomes degraded by the outgassing. Degraded vacuum results in increased windage losses for the flywheel rotor and increased energy costs in maintaining the flywheel rotor at the desired operating speed.

Composite material flywheel rims which rotate at high speeds, sometimes with peripheral speeds in excess of three times the speed of sound, typically operate in an evacuated chamber. The use of an evacuated chamber prevents aerodynamic drag or "windage" from heating the rim and causing potential failure as well as loss of efficiency. Some systems, usually operating at lower speeds, can use an operating chamber partially filled with a low density gas like hydrogen or helium instead of evacuated to reduce aerodynamic drag to a lesser extent. However, the generally accepted practice is to operate flywheel rotors with composite material flywheel rims in a vacuum of $10^{-3}$ Torr pressure or lower.

Whichever aerodynamic loss prevention system is employed, the composite rim will operate in a closed chamber. Although some flywheel systems maintain the vacuum in the chamber through the use of an internal getter or external vacuum pump, it is very desirable to eliminate these devices or at the least to reduce the gas loads that they must accommodate. This makes the vacuum system much simpler and less costly.

When composite material rims such as but not limited to filament wound carbon fiber/epoxy or glass fiber/epoxy are placed in a vacuum, moisture and other gases are released over time. These gases contaminate the vacuum in the chamber and cause the pressure to increase unacceptably. The rate of release of gases is strongly influenced by temperature and increases significantly at higher temperatures. A common preparation technique for composite rims before entering service in the vacuum chamber is to bake the rim at an elevated temperature while under vacuum for some duration of time until most of the outgassing of the composite is complete. Although this is an effective method for gas removal and ultimately the reduction of the outgas rate of the composite rim in the vacuum in service, it is costly, inconvenient and not always feasible. Vacuum baking the rim would need to be done just prior to final assembly and the baking could take hours to several days. Other components attached to the composite rim before final assembly sometimes can not withstand the vacuum baking process and the heat can possibly result in unacceptable stresses due to differences in thermal expansions of the rim and other components. The use of low outgassing resins to manufacture the composite flywheel rim is one way possible to reduce the outgas rate without vacuum baking. However, low outgas resins such as cyanate esters can cost as much as fifty times more than conventional epoxies. Because of the high cost of low outgas resins, they are not suitable for manufacture of typical low cost composite rims.

Thus, there has long been a need in the flywheel art for a low cost composite flywheel rim that has a low rate of outgassing so that it can operate efficiently and without maintenance for long periods in a vacuum chamber.

SUMMARY OF THE INVENTION

Accordingly, this invention provides a composite material flywheel rim having a reduced rate of outgassing in a vacuum. The invention provides a flywheel system having a composite flywheel rim that has a metal coating that reduces the outgassing rate from the resin in the composite rim.

The composite flywheel rotor of this invention includes an annular rim mounted on a hub for high speed rotation in an evacuated flywheel enclosure. The composite rim includes a fiber-wound annulus in an epoxy matrix. A smooth epoxy layer is applied to the rim and is cleaned or maintained clean in preparation for a metal coating on the rim. The rim may be baked in a vacuum furnace to drive off the volitiles and water vapor, and a thin metal coating is applied over the entire rim to retard outgassing from the resin in the flywheel composite rim. The thickness of the thin metal coating is preferably on the order of about 1000–250,000 angstroms, although thicknesses up to several thousanths of an inch would be suitable. The metal coating on the flywheel rim is preferably aluminum because aluminum adheres well to epoxy and is economical. The metal coating is deposited on the flywheel rim by physical vapor deposition and may be built up by electroplating after an initial PVD coating. A tough protective polymer such as epoxy, polyurethane or the like may be applied over the metal coating to protect the metal coating from mechanical damage during handling.

DESCRIPTION OF THE DRAWINGS

The invention and its many attendant advantages will become more clear upon reading the following description of the preferred embodiments in conjunction with the following drawing, wherein.

DESCRIPTION OF THE PREFERRED EMBODIMENTS

Figure 1:
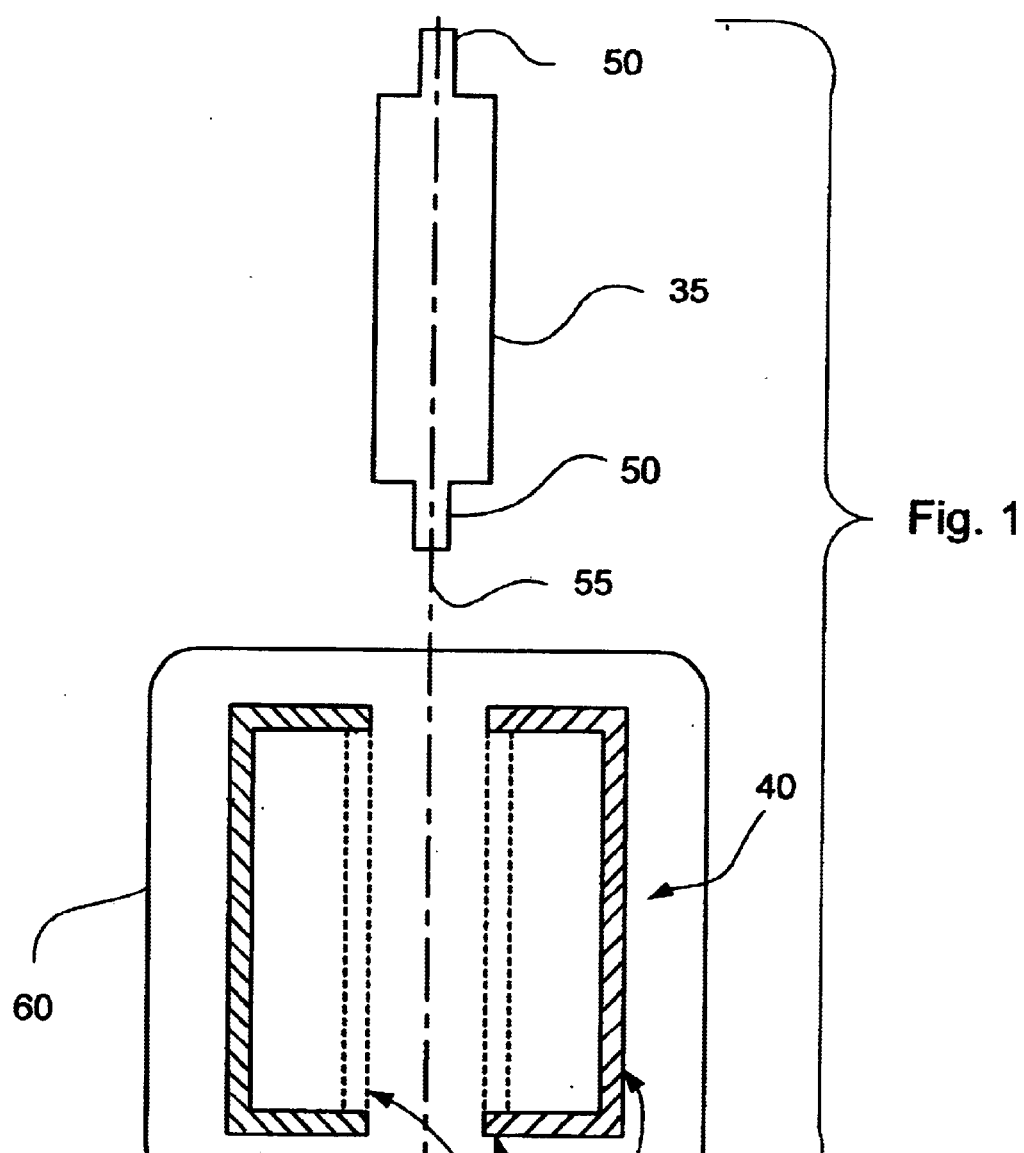
FIG. 1 is a sectional elevation of a flywheel rim in accordance with this invention, exploded off a hub.
Figure 2:
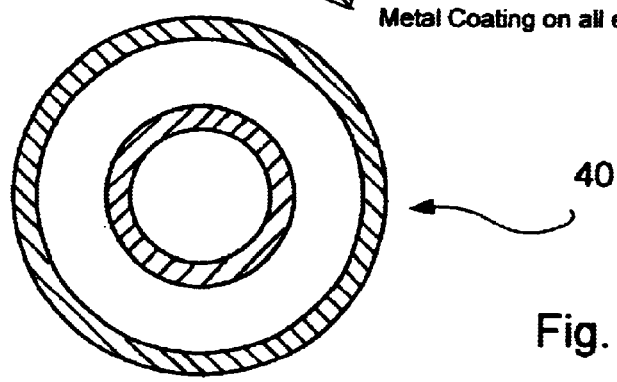
FIG. 2 is a plan view of the flywheel rim shown in FIG. 1.

Turning now to the drawings, wherein like reference characters designate identical or corresponding parts, and more particularly to FIG. 1 thereof, a flywheel system is shown having a hub 35 and a rim 40 mounted on the hub 35. The hub 35, has a pair of stub shafts 50 projecting axially along an axis of rotation 55 for journalling the hub for high speed rotation in magnetic bearings within a vacuum chamber and ballistic container 60 (shown schematically). Other structures for supporting the hub in the vacuum chamber 60 for high-speed rotation can also be used, as is well known in the flywheel industry. An electric motor/alternator (not shown) is coupled to the hub for initially driving the flywheel rotor up to speed, and then recovering the energy, stored in the flywheel rotor as rotational inertia, by converting it back to electrical energy in the alternator. A separate motor and generator may also be used, as is known in the art.

The disclosed invention reduces the outgas rate in flywheel system by putting a metal coating on the composite material rim. The outgas rate of the composite can be slowed by approximately a factor of ten compared to an uncoated rim. Data showing the effect of outgas rate reduction of epoxy resins by applying a metal coating is given by A K Gupta, K V Kurup (Smt) J Santhanam and P Vijendram in "Outgassing from Epoxy Resins and Methods for its Reduction." in Vacuum/volume27/number2. The metal used can be aluminum, nickel, copper, tin, indium and any other that can be successfully applied. The metal application to the composite material rim can be done by vacuum evaporation, cladding or dipping in molten metal. Another possible method for increased reduction of outgassing of the composite rim would be to vacuum bake the raw rim and then immediately apply a metal coating. The vacuum baking would be done to remove a large amount of the trapped gas in the rim. The metal coating would then seal the rim so that gas would be prevented or slowed from entering back into the rim before it was put into service. In service, the metal coating would also slow the outgassing of the rim. This combination would likely yield a composite rim with an even lower outgas rate than either a vacuum baked only rim or a metal coated only rim.

Metal coating of composite material structures has been done for spacecraft structures and satellite parts in the past. The goal in these cases has been for the reduction of the composite material outgassing rates for prevention of contaminants being deposited on nearby optics and also to prevent dimensional changes of critical composite structures as the result of internal gas being released. The purpose of this invention differs because its purpose is to reduce outgassing rates for composite material flywheel rims in a vacuum enclosure to the maintain the low pressure in the vacuum chamber in which the flywheel rim spins.

The preferred method of applying a metal coating on the flywheel rim is vacuum evaporation, also known as vacuum metalizing or physical vapor deposition (PVD), and the preferred metal for the coating is aluminum due to low cost, ease of application and good adhesion. However, it is likely that many types of metals can be easily vacuum evaporated onto the composite rim surface. Before metalizing, the composite rim is coated with epoxy to seal the fibers of the composite and provide a good surface for adhesion of the metal coating. The epoxy is then cured before the rim is vacuum metalized, however alternate methods could probably be used. Vacuum metalized coatings are very thin (1000–250,000 Angstroms). The small thickness of the coating helps it stay attached to the flywheel rim when spinning to high speeds because of the lack of mass and centrifugal loading that would tend to peel it from the rim.

During or after PVD coating of aluminum on the rim, the aluminum may react with water in the epoxy to create aluminum oxide, a ceramic. The aluminum oxide functions as a gas and vapor barrier just as the aluminum does, and I intend that the invention include aluminum oxide or other metal oxides which could be oxidized in this manner during PVD or other deposition processes. Thus, I intend that, as used herein, the term "metal coating" be understood to include a metal coating that is oxidized in deposition process.

For high rate production, it may be desirable to use a combination of deposition processes to achieve faster buildup to the desired thickness. Physical vapor deposition is a fairly slow process and is used typically for very thin coatings. A faster and less costly coating rate could be achieved by applying a thin coating of several hundred Angstroms on the rim by PVD coating to establish a conductive surface, and then electroplating the balance of the coating over the PVD coating.

The rotor, comprising the rim 40 mounted on the hub 35, can be coated as a unit after assembly, or the rim 40 could be metal coated prior to being mounted on the hub 35. Whatever the order, the objective is to ensure that all surfaces of the composite rim are covered by metal so that no surfaces are exposed through which outgassing could occur.

Obviously, numerous modifications and variations of the preferred embodiment described above are possible and will become apparent to those skilled in the art in light of this specification. For example, the preferred embodiment uses an aluminum coating, but it would be possible to use other metals or combinations of metals to achieve high adhesion and low gas and vapor permeability to achieve a more economical flywheel system that would maintain the vacuum conditions in the enclosure for the entire design life of the flywheel system. Naturally, other coating materials exist presently and will be developed in the future and these other materials may be used while remaining within the scope of this invention, which is not intended to be limited to any particular materials other than in those claims in which they are specifically claimed. Many functions and advantages are described for the preferred embodiment, but in many uses of the invention, not all of these functions and advantages would be needed. Therefore, I contemplate the use of the invention using fewer than the complete set of noted features, benefits, functions and advantages. Moreover, several species and embodiments of the invention are disclosed herein, but not all are specifically claimed, although it is intended that all be covered by generic claims. Therefore, it is my intention that each and every one of these species and embodiments, and the equivalents thereof, be encompassed and protected within the scope of the following claims, and no dedication to the public is intended by virtue of the lack of claims specific to any individual species.

Accordingly, it is expressly intended that all these embodiments, species, modifications and variations, and the equivalents thereof, are to be considered within the spirit and scope of the invention as defined in the following claims, wherein I claim:

What is claimed is:

1. A process for retarding degradation of a low pressure atmosphere in an flywheel enclosure containing a flywheel system having a flywheel rotor including a composite rim, comprising:

applying a thin metal coating to said composite rim;

installing said flywheel rotor in said enclosure; and evacuating air in said enclosure to create a low pressure atmosphere therein;

whereby, said thin metal coating on said composite rim retards outgassing of water vapor and resin volatiles into said low pressure atmosphere.

2. A process as defined in claim 1, further comprising;

applying a smooth epoxy layer to the rim and cleaning or maintaining said applied layer of epoxy clean in preparation for said applying of said metal coating.

3. A process a defined in claim 2, further comprising:

applying a protective coating over said thin metal coating to protect said thin metal coating against mechanical damage during handling.

4. A process as defined in claim 3, wherein:

said thin metal coating is on the order of about 1000–250,000 Angstroms.

5. A process as defined in claim 4 wherein:

said metal coating is applied by physical vapor deposition.

6. A process as defined in claim 5, further comprising:

applying an additional coating on said physical vapor deposition application by electroplating.

7. A process as defined in claim 1, further comprising:

applying a protective coating over said thin metal coating to protect said thin metal coating against mechanical damage during handling.

8. A process as defined in claim 7, wherein:

said thin metal coating is on the order of about 1000–250,000 Angstroms.

9. A process as defined in claim 8 wherein:

said metal coating is applied by physical vapor deposition.

10. A process as defined in claim 9, further comprising:

applying an additional coating on said physical vapor deposition application by electroplating.

11. A process as defined in claim 1, wherein:

said thin metal coating is on the order of about 1000–250,000 Angstroms.

12. A process as defined in claim 11 wherein:

said metal coating is applied by physical vapor deposition.

13. A process as defined in claim 12, further comprising:

applying an additional coating on said physical vapor deposition application by electroplating.

14. A process as defined in claim 1 wherein:

said metal coating is applied by physical vapor deposition.

15. A process as defined in claim 14, further comprising:

applying an additional metal coating on said physical vapor deposition application by electroplating.

16. A process for producing a low-outgassing flywheel rim for a flywheel energy storage system having a flywheel, including said rim, supported on bearings for high-speed rotation in an evacuated enclosure, said process comprising:

hoop-winding a composite ring with resin-impregnated filaments, and curing said resin to produce cured raw composite rim for a flywheel;

vacuum baking said raw rim to remove trapped gas and water in said raw rim to produce a fully cured and baked composite rim; and immediately after baking, applying a thin metal coating to said baked composite rim to retard gas and water vapor from entering back into said rim before putting said rim into service, and to retard outgassing of water vapor and resin volatiles into said evacuated enclosure after installation of said flywheel in said enclosure and evacuating said enclosure.

17. A process for producing a low-outgassing flywheel rim as defined in claim 16, wherein:

said thin metal coating is on the order of about 1000–250,000 angstroms thick.

18. A process for producing a low-outgassing flywheel rim as defined in claim 17, wherein:

said thin metal coating is applied by physical vapor deposition coating.

19. A process for producing a low-outgassing flywheel rim as defined in claim 18, further comprising:

applying an additional metal coating on said physical vapor deposition application by electroplating.

* * * * *